(12) United States Patent
Chien

(10) Patent No.: US 9,699,288 B1
(45) Date of Patent: Jul. 4, 2017

(54) COMMUNICATION DEVICE AND METHOD FOR DISGUISING COMMUNICATION ENVIRONMENT THEREOF

(71) Applicant: HON HAI PRECISION INDUSTRY CO., LTD., New Taipei (TW)

(72) Inventor: Cheng-Ching Chien, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/230,431

(22) Filed: Aug. 7, 2016

(30) Foreign Application Priority Data

Mar. 31, 2016 (TW) .................................. 105110426

(51) Int. Cl.
  *H04M 1/725* (2006.01)
  *G10L 21/0208* (2013.01)
  *H04B 1/3827* (2015.01)
  *H04M 3/22* (2006.01)

(52) U.S. Cl.
  CPC ..... *H04M 1/72525* (2013.01); *G10L 21/0208* (2013.01); *H04B 1/3833* (2013.01); *H04M 3/2281* (2013.01)

(58) Field of Classification Search
  None
  See application file for complete search history.

(56) References Cited

U.S. PATENT DOCUMENTS

| | | | |
|---|---|---|---|
| 2008/0044035 A1* | 2/2008 | Agrawal | H04M 1/6008 381/71.1 |
| 2011/0103614 A1* | 5/2011 | Cheung | H04R 1/403 381/94.1 |
| 2014/0043943 A1* | 2/2014 | Lavery | G01S 1/74 367/118 |
| 2014/0222438 A1* | 8/2014 | Courtney, III | H04L 67/2823 704/500 |

* cited by examiner

Primary Examiner — Alejandro Rivero
(74) Attorney, Agent, or Firm — Steven Reiss

(57) ABSTRACT

A method for disguising the environment and thus the location in which a telephone is being used includes acquiring a disguised environmental sound from a storage device in response to a selection of a user, controlling a voice acquiring device to acquire voice of the user and actual undisguised environmental noise during a call. An environmental noise signal is removed and replaced by an environment-disguising sound signal. An ultrasonic signal can be generated and synthesized with the transmitted voice signal to indicate mis-use of a communication device notwithstanding the environment-disguising noises.

13 Claims, 5 Drawing Sheets

COMMUNICATION DEVICE AND METHOD FOR DISGUISING COMMUNICATION ENVIRONMENT THEREOF

CROSS-REFERENCE TO RELATED APPLICATIONS

This application claims priority to Taiwan Patent Application No. 105110426 filed on Mar. 31, 2016, the contents of which are incorporated by reference herein.

FIELD

The subject matter herein generally relates to communication technology, and particularly to a communication device and a method for disguising communication environment thereof.

BACKGROUND

A communication device like a smart phone can remove a majority of environmental noise during calls, but some noise can still be heard by a user on the other end of the call. In that case, the surroundings where the users are located may be easily identified.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
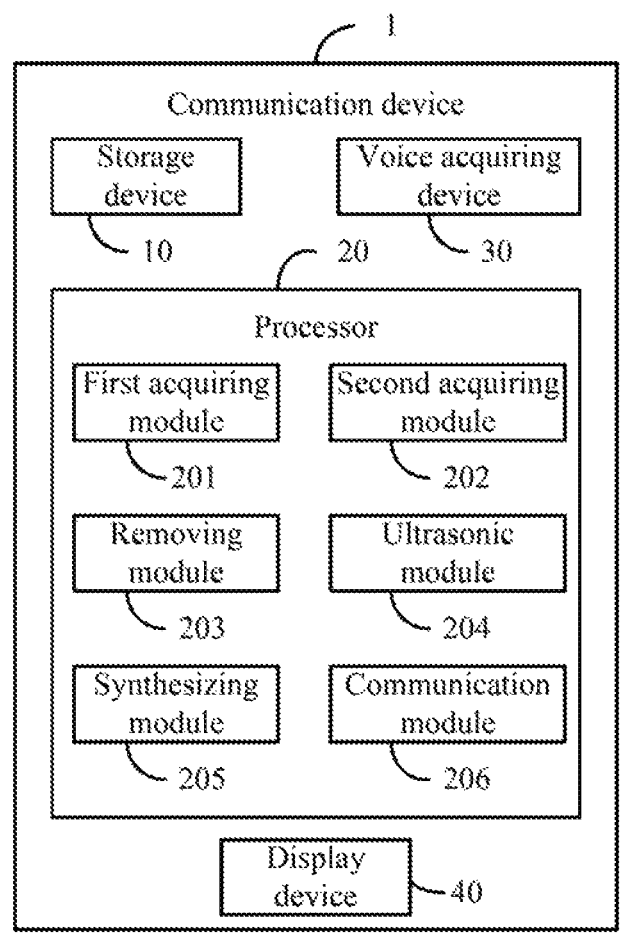
FIG. 1 is a block diagram of a communication device of one embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one."

Furthermore, the term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives. The term "comprising" means "including, but not necessarily limited to"; it specifically indicates open-ended inclusion or membership in a so-described combination, group, series, and the like.

FIG. 1 illustrates a communication device 1. The communication device 1 includes, but is not limited to, a storage device 10, a processor 20, a voice acquiring device 30, and a display device 40. In the illustrated embodiment, the communication device 1 can be a smart phone, a personal computer, or other suitable device with a call function.

The storage device 10 stores a number of environmental sounds. In the illustrated embodiment, the environmental sounds include, but are not limited to, music, sounds of keyboard clicks, or the sound of rain. The stored environmental sounds can be bundled with a system of the communication device 1 and/or downloaded by a user.

In at least one embodiment, the storage device 10 can include various types of non-transitory computer-readable storage mediums. For example, the storage device 10 can be an internal storage system, such as a flash memory, a random access memory (RAM) for temporary storage of information, and/or a read-only memory (ROM) for permanent storage of information. The storage device 10 can also be an external storage system, such as a hard disk, a storage card, or a data storage medium. The processor 20 can be a central processing unit (CPU), a microprocessor, or other data processor chip that performs functions of the communication device 1.

Figure 2:
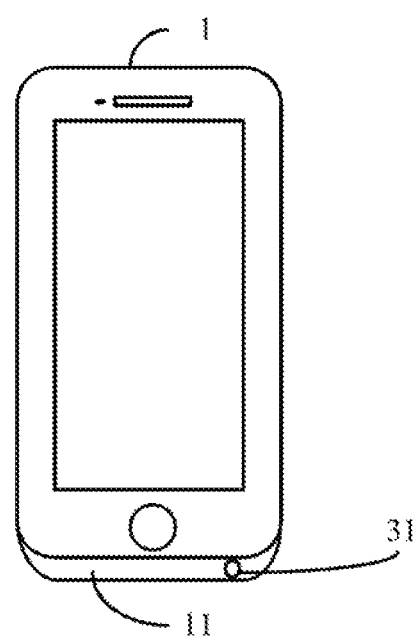
FIG. 2 is a front view of the communication device of FIG. 1 of one embodiment.
Figure 3:
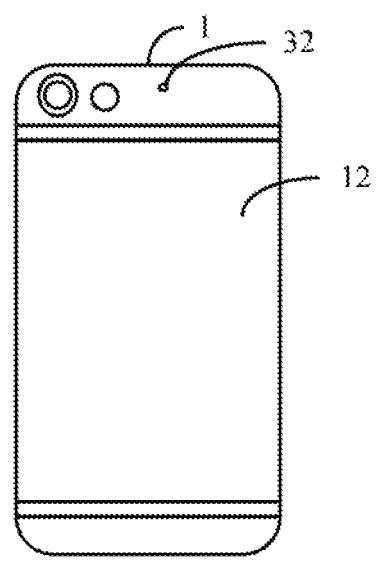
FIG. 3 is a back view of the communication device of FIG. 2.

Referring to FIGS. 2-3, the voice acquiring device 30 includes a first microphone 31 and a second microphone 32. The communication device 1 includes, but is not limited to, a bottom 11 and a back 12. In the illustrated embodiment, the first microphone 31 is arranged on the bottom 11 of the communication device 1, and is used for acquiring voice of the user together with any actual environmental noise during a call. The second microphone 32 is away from the first microphone 31, and is arranged on a top of the back 12 of the communication device 1, the second microphone 32 is used for acquiring the undisguised environmental noise during the call.

As illustrated in FIG. 1, the processor 20 of the communication device 1 includes a first acquiring module 201, a second acquiring module 202, a removing module 203, an ultrasonic module 204, a synthesizing module 205, and a communication module 206. The modules 201-206 of the processor 20 can be collections of software instructions stored in the storage device 10 of the communication device 1 and executed by the processor 20. The modules 201-206 of the processor 20 also can include functionalities represented as hardware or integrated circuits, or as software and hardware combinations, such as a special-purpose processor or a general-purpose processor with special-purpose firmware.

Figure 4:
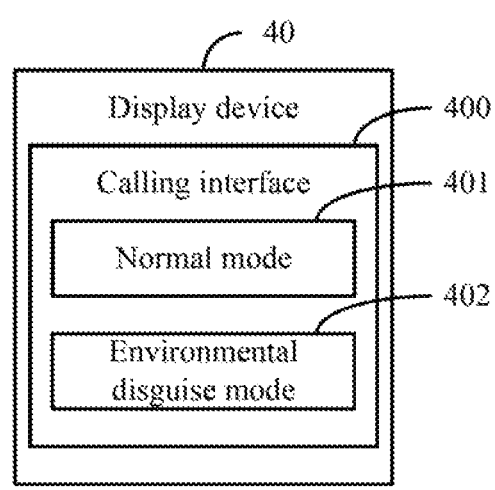
FIG. 4 is a block diagram of a calling interface of the communication device of FIG. 1 of one embodiment.

FIG. 4 illustrates a calling interface 400 of the communication device 1. When the communication device 1 receives an incoming call or makes a call, the display device 40 can provide the calling interface 400. In the illustrated embodiment, the display device 40 can be a touch screen. The calling interface 400 includes, but is not limited to, an option of normal mode 401 and an option of environmental disguise mode 402.

When answering the call or making the call, the user can select one of the two options, thereby the communication device 1 can enter the selected mode. For example, when the option of normal mode 401 is selected, the communication device 1 enters the normal mode. At this time, a receiver on the other end of the call can hear the voice of the user and any actual environmental noise. When the option of environmental disguise mode 402 is selected, the communication device 1 enters the environmental disguise mode, and then the receiver on the other end of the call can hear the voice of the user and a disguised environmental sound.

The first acquiring module 201 acquires a disguised environmental sound from the storage device 10 in response to a selection of the user. In the illustrated embodiment, before the call is connected, the calling interface 400 further provides an option for the disguised environmental sounds. The user can select such option, then the calling interface 400 provides a list which includes all of the disguised environmental sounds stored in the storage device 10. The user can select one from the list, the first acquiring module 201 acquires a selected disguised environmental sound from the storage device 10 and applies it during the call.

When the user starts the call (e.g., answering the incoming call or making the call), the second acquiring module 202 controls the voice acquiring device 30 to acquire the voice of the user and the actual undisguised environmental noise during the call. In the illustrated embodiment, the second acquiring module 202 controls the first microphone 31 to acquire the voice of the user mixed with the undisguised environmental noise during the call, and controls the second microphone 32 to acquire the undisguised environmental noise during the call.

The removing module 203 removes an undisguised environmental noise signal. In the illustrated embodiment, the removing module 203 can acquire an amplitude and a phase of the undisguised environmental noise signal, generate an audio signal with an amplitude which is the same as an acquired amplitude and a phase which is contrary to an acquired phase, and superimpose a generated audio signal on the undisguised environmental noise signal so as to cancel the undisguised environmental noise signal.

In another embodiment, the removing module 203 can also enable subtraction of the voice signal mixed with the undisguised environmental noise signal acquired by the first microphone 31 from the undisguised environmental noise signal acquired by the second microphone 32, thus removing the undisguised environmental noise signal during the call.

The ultrasonic module 204 generates an ultrasonic signal. In the illustrated embodiment, the ultrasonic module 204 is a circuit which is embedded on the processor 20 for generating the ultrasonic signal.

The synthesizing module 205 synthesizes the voice signal without the environmental noise signal, a disguised environmental sound signal, and the ultrasonic signal into a mixed audio signal. In the illustrated embodiment, the synthesizing module 205 can be an audio synthesizer or an audio synthesizing circuit.

In the illustrated embodiment, the ultrasonic signal in the mixed audio signal can act as an indicator that a calling device is being used illegally or for a non-authorized purpose. When a lawbreaker utilizes the function of disguising a communication environment during making or answering a call through the communication device 1, because a frequency of the ultrasonic signal is beyond a range audible to the human ear, a law enforcement agency can utilize an ultrasonic checking device to check whether the signals which are exported by a communication device 1 is being mis-used. When the ultrasonic signal is included in the exported signals, the mis-use of the communication device 1 is revealed.

The communication module 206 transmits the mixed audio signal which is synthesized by the synthesizing module 205 to a receiver. In the illustrated embodiment, when the mixed audio signal is transmitted to the receiver, the user of the receiver can hear the voice of the user and the disguised environmental sound.

Figure 5:
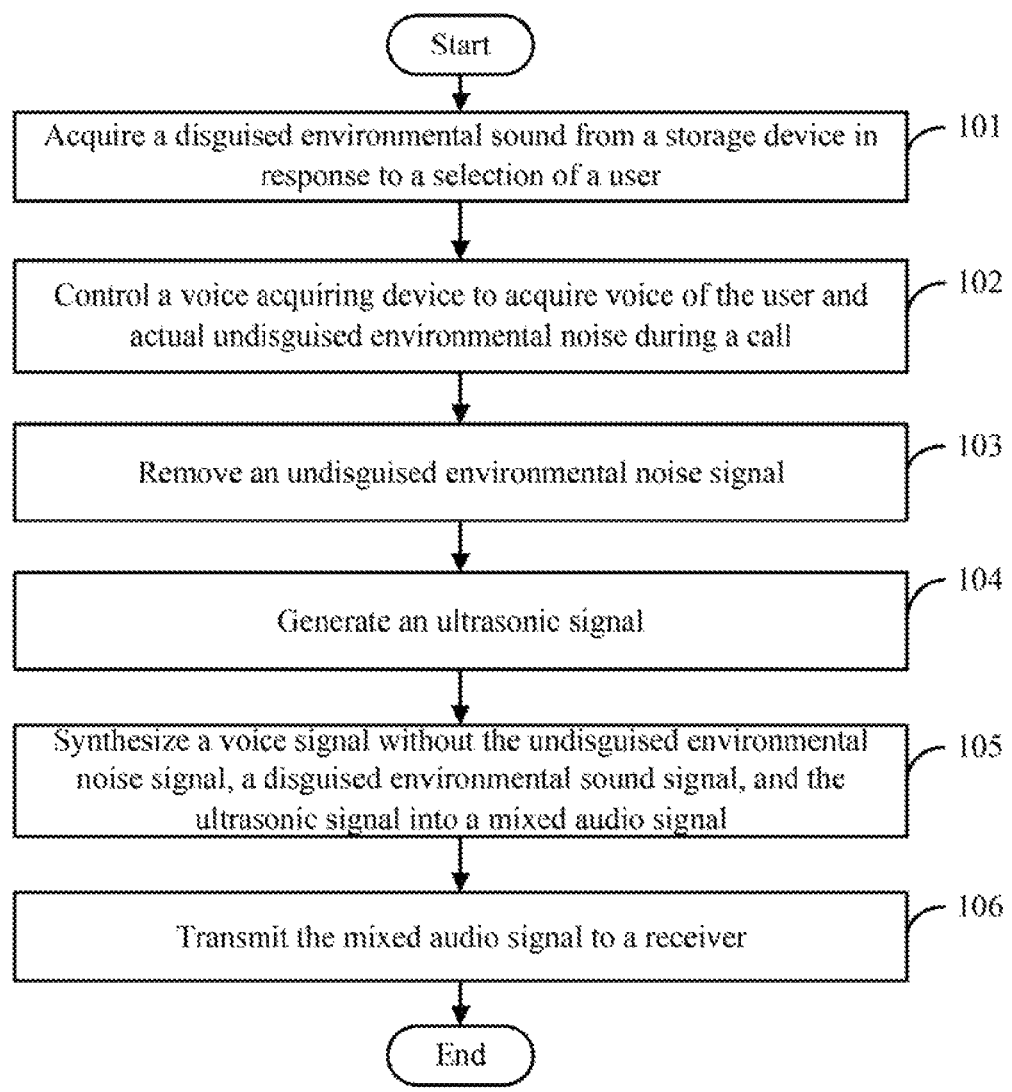
FIG. 5 illustrates a flowchart of one embodiment of a method for disguising communication environment.

FIG. 5 illustrates a flowchart of a method for disguising communication environment. The method is provided by way of example, as there are a variety of ways to carry out the method. The method described below can be carried out using the configurations illustrated in FIG. 1, for example, and various elements of these figures are referenced in explaining the example method. Each block shown in FIG. 5 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 101.

At block 101, a first acquiring module acquires a disguised environmental sound from a storage device in response to a selection of a user.

At block 102, when the user starts a call, a second acquiring module controls a voice acquiring device to acquire voice of the user and actual undisguised environmental noise during the call.

At block 103, a removing module removes an undisguised environmental noise signal.

At block 104, the ultrasonic module generates an ultrasonic signal.

At block 105, the synthesizing module synthesizes a voice signal without the undisguised environmental noise signal, a disguised environmental sound signal, and the ultrasonic signal into a mixed audio signal.

At block 106, the communication module transmits the mixed audio signal to a receiver.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being exemplary embodiments of the present disclosure.

What is claimed is:
1. A communication device comprising:
a processor;
a voice acquiring device coupled to the processor; and
a storage device coupled to the processor and storing a plurality of environmental sounds and instructions for execution by the processor to cause the processor to:

acquire a disguised environmental sound from the storage device in response to a selection of a user;

control, when the user starts a call, the voice acquiring device to acquire voice of the user and actual undisguised environmental noise during the call;

remove an undisguised environmental noise signal;

generate an ultrasonic signal;

synthesize a voice signal without the undisguised environmental noise signal, a disguised environmental sound signal, and the ultrasonic signal into a mixed audio signal; and transmit the mixed audio signal to a receiver.

2. The communication device according to claim 1, wherein the voice acquiring device comprises a first microphone and a second microphone.

3. The communication device according to claim 2, wherein the processor is further caused to:

control the first microphone to acquire the voice of the user mixed with the undisguised environmental noise during the call; and control the second microphone to acquire the undisguised environmental noise signal during the call.

4. The communication device according to claim 1, wherein the processor is further caused to:

acquire an amplitude and a phase of the undisguised environmental noise signal;

generate an audio signal with an amplitude which is the same as an acquired amplitude of the undisguised environmental noise signal and a phase which is contrary to an acquired phase of the undisguised environmental noise signal; and superimpose a generated audio signal on the undisguised environmental noise signal so as to remove the undisguised environmental noise signal.

5. The communication device according to claim 1, wherein the processor is further caused to:

acquire the disguised environmental sound from the storage device randomly.

6. The communication device according to claim 1, further comprising a circuit for generating the ultrasonic signal, wherein the circuit is integrated on the processor.

7. The communication device according to claim 6, wherein the processor is further caused to:

control the circuit to generate the ultrasonic signal.

8. The communication device according to claim 1, further comprising a synthesizer coupled to the processor.

9. The communication device according to claim 8, wherein the processor is further caused to:

control the synthesizer to synthesize the voice signal without the undisguised environmental noise signal, the disguised environmental sound signal, and the ultrasonic signal into the mixed audio signal.

10. The communication device according to claim 1, wherein the plurality of environmental sounds stored in the storage device comprises sounds bundled with a system of the communication device and sounds downloaded by the user.

11. A method for disguising communication environment comprising:

acquiring a disguised environmental sound from a storage device in response to a selection of a user;

controlling a voice acquiring device to acquire voice of the user and actual undisguised environmental noise during a call;

removing an undisguised environmental noise signal;

generating an ultrasonic signal;

synthesizing a voice signal without the undisguised environmental noise signal, a disguised environmental sound signal, and the ultrasonic signal into a mixed audio signal; and transmitting the mixed audio signal to a receiver.

12. The method according to claim 11, wherein controlling the voice acquiring device to acquire the voice of the user and the actual undisguised environmental noise during the call comprises:

controlling a first microphone to acquire the voice of the user mixed with the undisguised environmental noise during the call; and controlling a second microphone to acquire the undisguised environmental noise during the call.

13. The method according to claim 11, wherein removing the undisguised environmental noise signal comprises:

acquiring an amplitude and a phase of the undisguised environmental noise signal;

generating an audio signal with an amplitude which is the same as an acquired amplitude of the undisguised environmental noise signal and a phase which is contrary to an acquired phase of the undisguised environmental noise signal; and superimposing a generated audio signal on the undisguised environmental noise signal so as to remove the undisguised environmental noise signal.

* * * * *